Sept. 22, 1953      J. R. SUCHER      2,652,597
PROCESS FOR COMPRESSION MOLDING PLASTIC MATERIALS
Filed March 28, 1950      2 Sheets-Sheet 1

*INVENTOR.*
JOSEPH R. SUCHER.
BY
*attorney*

Sept. 22, 1953 J. R. SUCHER 2,652,597
PROCESS FOR COMPRESSION MOLDING PLASTIC MATERIALS
Filed March 28, 1950 2 Sheets-Sheet 2

INVENTOR.
JOSEPH R. SUCHER.
BY

UNITED STATES PATENT OFFICE 2,652,597

PROCESS FOR COMPRESSION MOLDING PLASTIC MATERIALS

Joseph R. Sucher, Woodmere, N. Y., assignor to Emsig Manufacturing Company, New York, N. Y., a firm Application March 28, 1950, Serial No. 152,492

7 Claims. (Cl. 18—55)

This invention relates to improvements in compression molding of plastic materials, i. e. molding in a mold which is open and preheated when the moldable material is introduced and which shapes and cures the moldable material by the action of heat and pressure upon closing of the mold. My invention has particular relation to the compression molding of liquid, thermosetting resinous compositions of varying viscosities.

The main object of my present invention consists in providing a process for converting liquid, thermosetting resinous compositions by compression molding into molded articles of high quality, which, in addition to satisfactory mechanical properties and structure, show a faultless surface and finish.

Another object of my invention is to provide a method for producing shaped articles by compression molding of liquid, thermosetting unsaturated polyester compositions.

Further objects and the advantages of my invention will be apparent from the appended claims and drawings and the following specification which illustrate by way of example and without limitation some typical embodiments of my invention.

In the conventional procedure of compression molding, at the start of the procedure the mold is open and heated to the desired temperature, which depends primarily on the character of the material treated and also on the design and dimensions of the article to be formed by molding. The necessary amount of the molding composition is then introduced in solid condition into the cavity or cavities, the hot mold parts are closed and thereby heat and pressure is applied to the material introduced into the mold. The action of heat and pressure is continued until the material is sufficiently cured, after which the mold is opened and the molded articles are removed.

It has been found that this known procedure cannot be satisfactorily applied to the compression molding of liquid, thermosetting resinous compositions, because upon closing the mold parts the air often cannot completely escape from the space between the surface of the liquid, resinous composition placed in the cavity, and the surface of the registering upper mold parts, and the air remaining in this space causes the formation of bubbles in the molded articles.

I have now found that this difficulty can be overcome and shaped articles of excellent quality and appearance and free from bubbles can be produced from liquid, thermosetting resinous compositions by proceeding in the manner described hereinafter and illustrated diagrammatically in the appended drawings.

While the details of the invention will be explained in the following in connection with the molding of button blanks from thermosetting unsaturated polyester resin compositions, it is to be understood that my invention is not limited to these particular compositions and/or these particular shaped articles and may be applied to the molding of other thermosetting, liquid resinous compositions and to the production of other shaped articles.

The thermosetting unsaturated polyester resin compositions which are particularly suitable for carrying out my present invention are liquid polymerizable compositions. They are obtained by reacting (a) polycarboxylic acids such as maleic acid, fumaric acid, itaconic acid, phthalic acid; (b) polyhydric alcohols or glycols, such as ethylene glycol, diethylene glycol, pentaerythritol. In preparing thermosetting polyesters by condensation of such acids and alcohols, at least one unsaturated compound must be used, which may be one of the acids or one of the hydroxy compounds. In addition to the polyester or polyesters thus formed, the thermosetting polyester resin compositions also contain an unsaturated, polymerizable hydrocarbon containing a $C=CH<$ linkage, which serves as a modifier and solvent for the unsaturated polyester and, upon polymerization, forms a copolymer with the polyester. As examples of such unsaturated hydrocarbons, styrene, which is very frequently used, cyclopentadiene and divinyl benzene may be mentioned. The unsaturated hydrocarbon may be partly or completely substituted by another unsaturated, compatible and co-polymerizable liquid compound containing a $C=CH<$ linkage. Furthermore, the thermosetting polyester composition to be molded may contain suitable amounts of polymerization catalysts.

In carrying out my invention, I prefer to subject the thermosetting polyester resin compositions to compression molding in a condition of sufficient prepolymerization. This procedure for obtaining such prepolymerization consists essentially in uniformly incorporating a polymerization catalyst, particularly an organic peroxide catalyst, in a liquid thermosetting polyester composition, and subjecting this composition preferably under heating, but avoiding local overheating, to a condition at which (a) the thermosetting, unsaturated polyester resin has the highest viscosity before gelling and (b) is still soluble or homogeneously dispersible in the starting resin and can be homogeneously diluted also with other compatible liquid resins capable of being co-polymerized with the starting resin. Prior to molding, the prepolymerized polyester resin may be mixed with compatible, copolymerizable materials. Fibrous or other filling materials, including light-reflecting lamellae, may be mixed with the thermosetting polyester resin composition prior to or after the beforementioned prepolymerization.

*Example 1.*—To an unsaturated, thermosetting liquid polyester composition obtained by homogeneously mixing 1 part by weight of styrene and 2 parts by weight of a polyester formed by condensation of 6 mols of propylene glycol, 5 mols of fumaric acid and 1 mol phthalic acid anhydride at about 180° C., 0.05% methyl-ethyl ketone peroxide and 0.5% benzoyl peroxide were homogeneously admixed, and the mixture was heated in a water bath at about 60° C. for about 80–100 minutes in order to effect prepolymerization. After some cooling an additional amount of polymerization catalyst is preferably added and the composition is now ready for molding. If desired, the composition is subjected to the action of vacuum prior to further processing, in order to remove air bubbles.

From the viscous liquid composition thus obtained, disc shaped button blanks of ½" diameter and $\frac{3}{16}$" thickness are molded in the mold illustrated in the enclosed drawings described further below. The lower mold part is preheated to about 90°–110° C. The cavities of the lower mold part are filled with prepolymerized composition, care being taken in order to avoid the inclusion of air bubbles in the resinous composition during feeding to the cavities. A moderate excess of the composition remains on the surface of the lower mold part between the cavities. The surface of the composition filled in the lower mold part is now covered with a conventional thin sheet of cellulosic material, such as Cellophane which is large enough to cover the surface of the lower mold part within the retaining wall and to cover also the upper edges of the retaining walls of the mold. The press is then closed, the upper mold part being preheated to 120°–130° C., the pressure raised to about 500 lbs. per square inch, and this pressure maintained for about 3 minutes, during which curing to the hard, insoluble and infusible condition is effected. The excess resin left after complete filling of the cavities is squeezed out between the upper mold part and the retaining walls. The press is now opened and the molded pieces are removed. All the blanks are faultless and show no inclusion of air bubbles.

If a molding operation is carried out in the same mold with the identical material and under identical conditions, but without the above described use of the Cellophane sheet, the molded blanks showed the inclusion of air bubbles. This is also the case if only the edges of the retaining walls of the mold are covered with a strip or strips of Cellophane, and molding is carried out under the above described conditions but without covering with Cellophane the surface of the resinous composition filled in the cavities. The formation of bubbles can also be avoided if, in the above described manner, a Cellophane sheet of such dimensions is used that it substantially covers the surface of the lower mold part within the retaining walls, but does not cover the upper edges of the retaining walls.

Without limiting myself to any theory, it seems that in carrying out my invention, upon the application of pressure the resinous composition exerts pressure on the Cellophane sheet or membrane which is then caused to stretch until it comes in tight contact with the wall of the upper cavity and causes the escape of air from this cavity.

In carrying out my invention, it is essential that the moldable, thermosetting liquid resinous composition be introduced into the cavities slowly and carefully in order to avoid the formation or inclusion of air bubbles. Furthermore, the Cellophane sheet has to be in direct contact with the surface of the composition placed in the lower mold part, i. e. without the inclusion of air between the surface of the composition and the Cellophane sheet, and the molding pressure should be sufficiently high for forcing the Cellophane sheet into tight contact with the wall of the cavities in upper mold part.

I prefer the use of a sheet of Cellophane as a membrane, because I found that Cellophane is insoluble in the thermosetting resinous compositions, is easily wetted by resinous compositions of the type described above, has the necessary expansibility and separates easily from the cured article after molding. I have also found that the molded pieces show a high gloss on the surface covered with Cellophane. However, instead of Cellophane other materials showing the beforementioned characteristics, i. e. insolubility in the moldable, thermosetting composition, capability of being easily wetted by the moldable composition, sufficient elasticity and easy separation from the molded article, may also be used. As examples of such other materials, thin sheets consisting of cellulose esters, such as cellulose acetate, cellulose ethers, casein films, may be mentioned.

For producing a dull finish, I use various grades of paper which meets the above-mentioned requirements.

*Example 2.*—The unsaturated, thermosetting liquid polyester composition used in Example 1 is subjected to the treatment described in said example, with the only difference that about 3% of pearl-essence is homogeneously incorporated in the prepolymerized composition prior to molding. By following the procedure described in Example 1, button blanks having integral pearly sheen are obtained.

Instead of pearl-essence, suitable fibrous or non-fibrous filling materials may be incorporated in the prepolymerized composition or the latter may be mixed with a compatible and co-polymerizable material, prior to molding.

*Example 3.*—A liquid resinous thermosetting composition consisting of 70 parts of ethylene glycol polyester of endomethylene tetrahydrophthalic acid, with 30 parts of styrene, ¼ part of maleic anhydride, 1% benzoyl peroxide, is treated by a procedure which is in every respect analogous to that described in Example 1. The molding temperature is 125° C.

I have found that the process of my invention can be successfully applied also to the commercial thermosetting unsaturated polyester resin compositions marketed under various trademarks. As examples of such compositions the products marketed under the trade-mark "Laminac PDL-7-363," "Laminac 4201" and "Laminac 4129" (American Cyanamid Co.); "Selectron 5000" (Pittsburgh Plate Glass Co.); "Vibrin 108" (U. S. Rubber Co.) and the Paraplex "P" series resins (Rohm & Haas Co.) are mentioned.

According to a modification of my invention, I provide the membrane consisting of Cellophane or the like with a special coating which, during the simultaneous application of heat and pressure in the molding operation, adheres to the cured surface of the molded article and remains there after the removal of the membrane. As examples of such coating, a gelatinized thermosetting polyester resin composition containing powdered mica, or letters or designs applied to the sheet of Cellophane or the like are mentioned.

In the enclosed drawing—

Figure 1 is a top view of the lower mold part of multiple mold for forming button blanks; while

Figure 1:
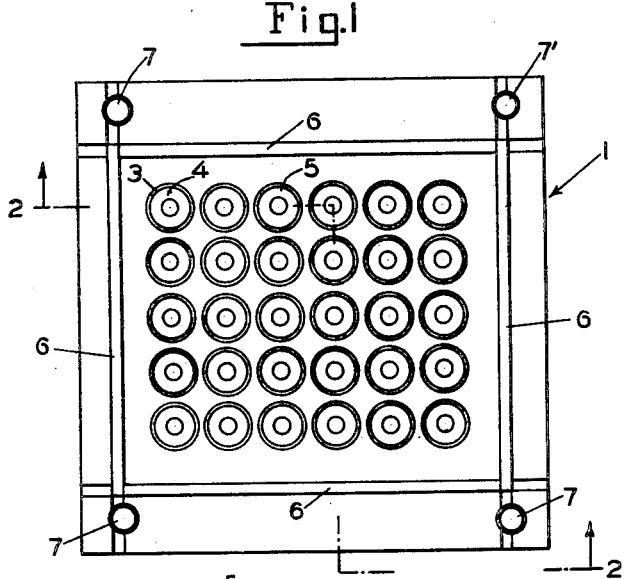
Figure 2:
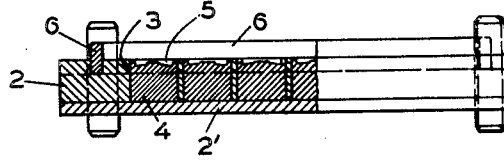
Figure 2 illustrates said mold partly in view and partly in section along line 2—2 of Figure 1.
Figure 3:
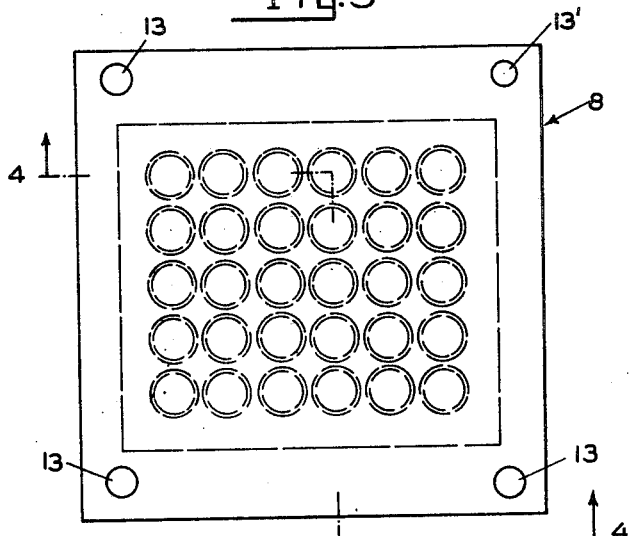
Figure 3 is a bottom view of the upper mold part and Figure 4 illustrates this mold part partly in view and partly in section along line 4—4 of Figure 3.
Figure 4:
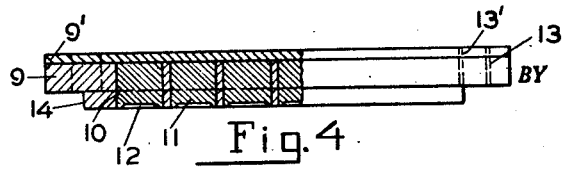
Figure 5:
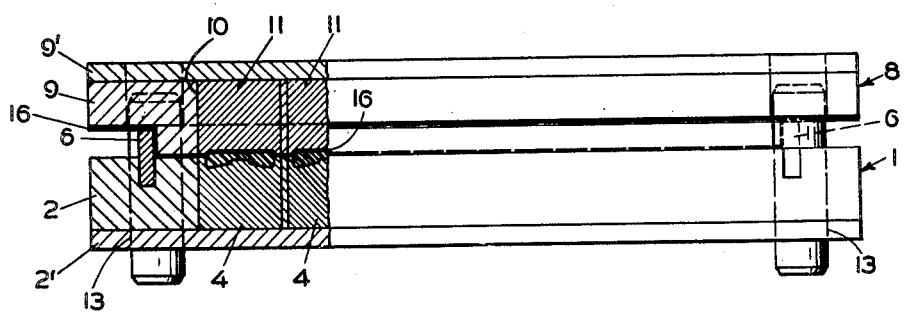
Figure 5 is an illustration partly in section and partly in view of the assembled closed mold and an article molded therein.

Referring now to the drawing in detail, the lower mold part shown in Figures 1 and 2 is generally designated by reference numeral 1. It consists of a plate 2 provided with openings 3 which are adapted to receive individual mold elements 4, the latter being provided with cavities 5. Retaining walls 6 are connected with plate 2 forming a right angle with said plate 2. A bottom plate 2' is fastened to plate 2 which is also provided with guide pins 7, 7'. The upper mold part 8, shown in Figures 3 and 4, comprises plate 9 which is provided with openings 10 adapted to receive individual mold elements 11 provided with cavities 12. The upper mold is provided with guide holes 13, 13' registering with guide pins 7, 7' and comprises the cover plate 9'. 14 denotes the projecting part of upper mold part 8, said part 14 having vertical lateral surfaces registering with the inner vertical surfaces of the retaining walls 6. These registering surfaces fit closely enough to obtain the necessary pressure during molding of the plastic article 15. 16 denotes the Cellophane sheet used.

While Figures 1–5 illustrate a mold for forming button blanks, it will be understood that the present invention is not limited thereto and can be used for articles of other shape and/or design.

It will be understood that my invention is not limited to the above described specific details, such as specific compositions, steps and conditions, etc., and may be carried out with various modifications. For example, instead of button blanks, for example slabs, plates, dishes, trays, etc., can be molded and the thermosetting resin compositions described above may be partly or completely substituted by other liquid thermosetting compositions in carrying out my invention. The viscosity of the resin compositions may vary within wide limits and compositions of syrup-like consistency as well as liquid compositions of lower viscosity may be used. The conditions of molding, especially the molding temperature, pressure and time depend primarily on the chemical nature of the thermosetting composition used and if a catalyst and/or filler is used also on the type of the catalyst and/or filler.

What I claim is:

1. A process for producing shaped articles by compression molding in a mold having an upper and a lower mold part provided with registering cavities, said lower mold part being provided with retaining walls spaced from and surrounding said cavities, the lateral surfaces of said upper mold part being spaced from the cavities of the upper mold part and registering with the inner surfaces of said retaining walls, said process comprising introducing a liquid, thermosetting polyester resin composition into the cavities of the lower mold part, in a moderate excess over the amount necessary to fill the cavities; applying a stretchable membrane which is substantially insoluble in and capable of being wetted by said polyester resin composition, resistant under the heat and pressure conditions of molding and separable from the molded cured product, to the surface of the liquid resinous material in the lower mold half, by causing the membrane to contact said material over its entire surface and thus exclude air from between said surface and said membrane, prior to the closing of the mold; subsequently closing the mold and subjecting it to heat and pressure.

2. A process for producing button blanks by compression molding in a mold having an upper and a lower mold part provided with registering cavities, said lower mold part being provided with retaining walls spaced from and surrounding said cavities, the lateral surfaces of said upper mold part being spaced from the cavities of the upper mold part and registering with the inner surfaces of said retaining walls, said process comprising introducing a liquid, thermosetting polyester resin composition into the cavities of the lower mold part, in a moderate excess over the amount necessary to fill the cavities; applying a stretchable membrane which is substantially insoluble in and capable of being wetted by said polyester resin composition, resistant under the heat and pressure conditions of molding and separable from the molded cured product, to the surface of the liquid resinous material in the lower mold half, by causing the membrane to contact said material over its entire surface and thus exclude air from between said surface and said membrane, prior to the closing of the mold; subsequently closing the mold and subjecting it to heat and pressure.

3. A process for producing button blanks by compression molding in a multiple compression mold having an upper and a lower mold part provided with registering cavities, said lower mold part being provided with retaining walls spaced from and surrounding said cavities, the lateral surfaces of said upper mold part being spaced from the cavities of the upper mold part and registering with the inner surfaces of said retaining walls, said process comprising introducing a liquid, thermosetting polyester resin composition into the cavities of the lower mold part, in a moderate excess over the amount necessary to fill the cavities; applying a stretchable membrane which is substantially insoluble in and capable of being wetted by said polyester resin composition, resistant under the heat and pressure conditions of molding and separable from the molded cured product, to the surface of the liquid resinous material in the lower mold half, by causing the membrane to contact said material over its entire surface and thus exclude air from between said surface and said membrane, prior to the closing of the mold; subsequently closing the mold and subjecting it to heat and pressure.

4. A process for producing button blanks by compression molding in a mold having an upper and a lower mold part provided with registering cavities, said lower mold part being provided with retaining walls spaced from and surrounding said cavities, the lateral surfaces of said upper mold part being spaced from the cavities of the upper mold part and registering with the inner surfaces of said retaining walls, said process comprising introducing a liquid, thermosetting polyester resin composition into at least one cavity of the lower mold part, in a moderate excess over the amount necessary to fill the cavities; applying a stretchable membrane which is substantially insoluble in and capable of being wetted by said polyester resin composition, resistant under the heat and pressure conditions of molding and separable from the molded cured product, to the surface of the liquid resinous material in the lower mold half, by causing the membrane to contact said material over its entire surface and thus exclude air from between said surface and said membrane, prior to the closing of the mold; subsequently closing the mold and subjecting it to heat and pressure.

5. A process as claimed in claim 1, in which Cellophane is used as the membrane.

6. A process as claimed in claim 1, in which paper is used as the membrane.

7. A process for producing button blanks by compression molding in a multiple compression mold having an upper and a lower mold part provided with registering cavities, said lower mold part being provided with retaining walls spaced from and surrounding said cavities, the lateral surfaces of said upper mold part being spaced from the cavities of the upper mold part and registering with the inner surfaces of said retaining walls, said process comprising introducing a liquid, thermosetting polyester resin composition containing light-reflecting lamellae substantially uniformly mixed therewith, into the cavities of the lower mold part, in a moderate excess over the amount necessary to fill the cavities; applying a stretchable membrane which is substantially insoluble in and capable of being wetted by said polyester resin composition, resistant under the heat and pressure conditions of molding and separable from the molded cured product, to the surface of the liquid resinous material in the lower mold half, by causing the membrane to contact said material over its entire surface and thus exclude air from between said surface and said membrane, prior to the closing of the mold; subsequently closing the mold and subjecting it to heat and pressure.

JOSEPH R. SUCHER.

References Cited in the file of this patent

UNITED STATES PATENTS

| Number | Name | Date |
|---|---|---|
| 2,363,900 | Pugh | Nov. 28, 1944 |
| 2,458,327 | Wood | Jan. 4, 1949 |
| 2,472,492 | Saffir | June 7, 1949 |
| 2,491,147 | Zahn | Dec. 13, 1949 |
| 2,527,387 | Arndt | Oct. 24, 1950 |